United States Patent [19]

Kobetz et al.

[11] 3,717,666

[45] Feb. 20, 1973

[54] PROCESS FOR PRODUCING ALUMINUM ALKOXIDES

[75] Inventors: Paul Kobetz; Hymin Shapiro; Fred J. Impastato, all of Baton Rouge, La.

[73] Assignee: Ethyl Corporation, Richmond, Va.

[22] Filed: Feb. 16, 1971

[21] Appl. No.: 115,887

[52] U.S. Cl. ............................................260/448 AD
[51] Int. Cl. ..................................................C07f 5/06
[58] Field of Search ..............................260/448 AD

[56] References Cited

UNITED STATES PATENTS

| | | | |
|---|---|---|---|
| 2,579,251 | 12/1951 | Coates et al. | 260/448 AD |
| 2,666,076 | 1/1954 | Rex et al. | 260/448 AD |
| 2,845,447 | 7/1958 | Carlson et al. | 260/448 AD |
| 2,965,663 | 12/1960 | Smith et al. | 260/448 AD |
| 3,094,546 | 6/1963 | Towers | 260/448 AD |
| 3,083,218 | 3/1963 | Hammerberg | 260/448 AD |
| 3,305,571 | 2/1967 | Cenker | 260/448 AD |

*Primary Examiner*—H. Sneed
*Attorney*—Donald L. Johnson, John F. Sieberth and Shelton B. McAnelly

[57] ABSTRACT

It is disclosed that the reaction of aluminum and alcohol to produce aluminum hydrocarbyl oxides is improved by catalysis with alkoxy alcohol.

19 Claims, No Drawings

PROCESS FOR PRODUCING ALUMINUM ALKOXIDES

BACKGROUND OF THE INVENTION

1. Field of the Invention

The invention relates to the preparation of organic aluminum compounds and in particular to the preparation of aluminum hydrocarbyl oxide compounds by reaction of aluminum and alcohol.

2. Description of the Prior Art

The production of hydrocarbyloxy aluminum compounds by reaction of aluminum and alcohol is a process that is known generally in the prior art as shown by the following patents which exemplify in a general way various alcohols and kinds of aluminum useful in a reaction of this type: U.S. Pat. Nos. 2,125,961; 2,229,528; 2,579,251; 2,636,865; and 2,666,076. The hydrocarbyloxy aluminum compounds of the present invention are useful in many ways; typically, in the preparation of synthetic cracking catalysts or hydroforming catalysts and of lubricant additives.

SUMMARY OF THE INVENTION

The present invention relates to an improvement in the process for producing aluminum alkoxides by reaction of aluminum and alcohol. In the improvement of the present invention catalysis is obtained through alkoxy alcohol of the formula:

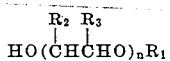

wherein $R_1$ is lower alkyl, aryl, alicyclic, aralkyl, alkaryl, or alkenyl radical having from one to about six carbon atoms; $R_2$ and $R_3$ are H, or lower alkyl radical having from one to about six carbon atoms, at least one of $R_2$ and $R_3$ being H, $R_3$ optionally being a part of a ring with $R_1$; $n$ is from 1 to about 5. The amount of the catalyst used is from about 1.0 to about 30 percent by weight based on the aluminum reacted.

In one aspect the present invention relates to an improvement in the aforesaid process wherein the reaction is conducted in the presence of an aromatic, alicyclic, or aliphatic hydrocarbon diluent or in the presence of an excess of alcohol.

Preferably the process of the present invention is conducted at a temperature of from about 25°C. to about 180°C.

Preferably the process of the present invention is conducted in the presence of a diluent or an excess of alcohol in an amount of from about 0.5 to about 10 parts by volume per part of alcohol reacted.

In a preferred aspect, the alcohol reacted is of the formula:

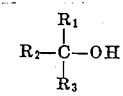

wherein $R_1$, $R_2$ and $R_3$ are H or alkyl radical each said alkyl radical having from one to about 20 carbon atoms.

A more preferred narrower range of temperature for the process of the present invention is from about 80°C. to about 150°C. An even more preferred range of temperature for the process of the present invention is from about 100°C. to about 130°C. A typical temperature for the process of the present invention is about 110°C. Preferably the present process is conducted at reflux of the diluent or alcohol at about atmospheric pressure.

Preferably the amount of catalyst used in the present process is from about 5 to about 20 percent by weight based on the aluminum reacted. Typically, the amount of the catalyst used in the present process is about 10 percent by weight based on the aluminum reacted.

Preferred alcohol used in the present process is the monohydric primary, secondary, or tertiary alcohol which is unsubstituted or with hydrocarbon only substitution. More preferred alcohol has straight chain unbranched carbon skeletal structure. Particularly preferred alcohol is saturated. In one category, preferred alcohols have from about one to about 10 carbon atoms per molecule, such as ethanol, isopropanol, butanol, isobutanol, and pentanol, singly or in various combinations of two or more thereof.

Preferred catalyst for the process of the present invention is of the formula:

wherein $R_1$ is lower alkyl, aryl, alicyclic, aralkyl, alkaryl or alkenyl radical having from one to about six carbon atoms, $n$ is from 1 to about 5. Particularly preferred catalysts are $HO(CH_2CH_2O)CH_3$, or $HO(CH_2CH_2O)_2CH_3$ or $HO(CH_2CH_2O)_3CH_3$, or tetrahydrofurfuryl alcohol, individually and in various combinations of two or more thereof.

In a preferred aspect the diluent is toluene, the catalyst is $HOCH_2CH_2OCH_3$ and the temperature of the reaction is controlled at reflux of the toluene at about atmospheric pressure.

In a preferred aspect of the present process, the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is ethanol and the alcohol is supplied in an amount of from about 0 to about 5 percent excess above stoichiometric relative to the aluminum fed.

In a preferred aspect of the present process, the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is isopropanol and the alcohol is supplied in an amount of from about 0 to about 5 percent excess relative to the aluminum.

In a preferred aspect of the present process, the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is dodecyl alcohol and the alcohol is supplied in an amount of from about 0 to about 5 percent excess above stoichiometric relative to the aluminum fed.

Typical alcohols useful in accordance with the present invention are:

| | |
|---|---|
| ethanol | nonadecanol |
| propanol | eicosanol |
| hexanol | 2-methyl butanol |
| dodecanol | 2-ethyl hexanol |
| tridecanol | 7-hexyl tetradecanol |
| hexadecanol | i-propanol |
| hexanol-2 | tridecanol-3 |
| 3-ethyl hexanol-3 | tetradecanol-3 |
| heptanol-3 | tetradecanol-6 |
| 2-phenyl-4-methyl-decanol-2 | octadecanol-2 |
| 3-phenyl-4-methyl-decanol-5 | nonadecanol-7 |
| undecanol-2 | benzyl alcohol |
| dodecanol-2 | cyclohexanol |

These and other such alcohols may be used singly or in combination in various cuts or mixtures to produce corresponding aluminum alkoxides. For example, a cut or mixture of decanol, dodecanol and tetradecanol may be fed to produce corresponding mixed alkoxides.

Typical catalysts used in accordance with the present invention are:

2-methoxyethanol  $CH_3OCH_2CH_2OH$ 2-(2-methoxy ethoxy)ethanol  $CH_3OCH_2CH_2OCH_2CH_2OH$ 2-cyclohexoxyethanol

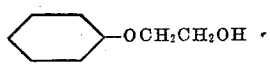

2-cyclohexylmethoxy-ethanol

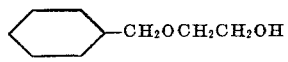

2-phenoxyethanol

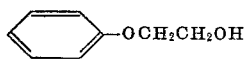

2-benzyloxyethanol

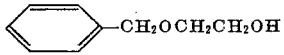

2-[3-methylcyclopentoxy]-ethanol

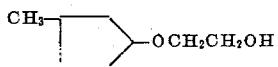

2-[4-isopropylcyclohexoxy]-ethanol

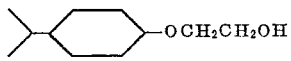

2-myrtenoxyethanol

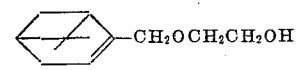

2-allyloxyethanol  $CH_2=CHCH_2OCH_2CH_2OH$ 2-crotoxyethanol  $CH_3CH=CHCH_2OCH_2CH_2OH$ 2-[4-ethylphenoxy]-ethanol

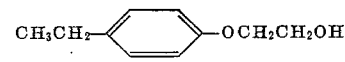

2-methoxy-2-methylethanol

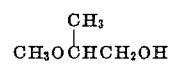

2-dodecoxy-1-isopropylethanol

2-neopentoxyethanol  $(CH_3)_3CCH_2OCH_2CH_2OH$ tetrahydrofurfuryl alcohol

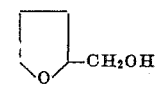

2-hydroxymethyl-tetrahydropyran

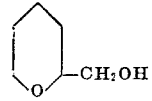

The process is preferably conducted in the presence of diluent or solvent media. The reactant alcohol is a suitable solvent or part of a mixed solvent system.

The amount of diluent or solvent is not particularly critical. Preferably enough is used to avoid a highly viscous reaction mass which tends to react slowly or provide undue problems of removal of liberated heat or hydrogen. On the other hand, excessive amounts of diluent increase the volumetric requirements for reaction vessels and associated equipment, particularly in connection with recovery. In general, the amount of diluent ranges from about 0.5 to about 10 parts per part of alcohol reacted. The term "reacted" as used in this sense means that which actually reacts in the course of the reaction, which in some instances is different from the amount fed. A preferred narrower range is from about 3 to about 5 parts of diluent per part of alcohol reacted.

Generally speaking, an important factor or property that frequently influences the choice of diluent more so than the specific identity of the diluent is boiling point to facilitate operation at reflux of the diluent at the reaction temperatures specified without requiring the use of expensive pressure or vacuum vessels and associated equipment. Of course, heat removal can be by other means so that even this factor is not always controlling. An important factor of the diluent in any instance is the absence of adverse effect upon the reaction or adverse reactivity with reactants or products. For example, many halo substituted hydrocarbons may tend to react with aluminum or its compounds. Thus, substitution in the diluent molecules is preferably limited to hydrocarbyl only, preferably alkyl only. Another important factor is cost and ease of recovery of the diluent. Thus, preferred diluents are aromatic, alicyclic and aliphatic hydrocarbons, such as toluene, benzene, xylene, cyclohexane, methyl cyclohexane, octane and dodecane. In most instances, toluene is a particularly preferred diluent.

Other suitable diluents in most cases are cyclopentane, cyclopentene, dodecane, dodecene, hexane, hexene-1, hexene-2, 2,4,4-trimethyl pentane, mineral oil, pinene, anisole, mesitylene, cumene, tetrahydrofuran, dioxane and the various complex ether solvents such as diethylene glycol diethyl ether, diethylene glycol dimethyl ether, ethylene glycol dibutyl ether.

The diluents may be used singly or in combination, as for examples, mineral oil, mixtures of octane and decane, octane and octene, octenes, hexanol and decane, etc.

With the catalysis of the present invention, the form, size and purity of aluminum used is not particularly critical; however, in general high surface-to-volume ratio and freedom from non-reactive coatings such as oxides or stearic acid are desired. Conventional characteristic impurities of a residual or deliberately added nature may be present. High purity aluminum (99.99+ percent) is usable as are alloys or physical mixtures containing one or more of silicon, iron, magnesium, titanium, zirconium, copper, sodium, zinc, cadmium, nickel, and the like. Scrap aluminum from various surfaces such as aircraft metal, castings, turnings, wire, granules from sheared ingots and the like is useful.

Other conventional aluminum activation schemes are useful in connection with the present invention; however, an important advantage of the present invention is that it does not require any one or combination of any of the previously known activation schemes. Thus the present invention typically avoids the need for activation by alloying or mixing with mercury or its compounds, halogens, titanium, silicon, zirconium, sodium, etc., or the need for severe physical manipulations such as cutting, grinding, powdering, or abrading to exceedingly fine particle sizes.

The following examples indicate preferred embodiments of the present invention

EXAMPLE I

To a 500-milliliter glass flask equipped with a heater, a stirrer and a reflux condenser was charged 6 grams of low titanium aluminum powder (Reynolds 5A), and 100 milliliters of toluene. The flask was heated to gentle reflux at about atmospheric pressure. Catalyst $HOCH_2CH_2OCH_3$ was then added, 0.8 gram. The heat was turned off and 25 grams of ethyl alcohol was added to the liquid in the flask over a period of 15 minutes. Rapid reaction was evidenced by the liberation of heat. Following this, a 5 gram portion of ethyl alcohol was added to the liquid in the flask over a period of 30 minutes.

The reaction mixture was then filtered to remove the diluent leaving a dry powder. The powder was analyzed and found to contain 16.4 percent aluminum. This compares with 16.8 0.09 theoretical. The sample was tested for unreacted aluminum by hydrolysis of a portion thereof with hydrochloric acid. About 0/09 millimols of gas per gram was evolved indicating virtually no free aluminum was present.

EXAMPLE II

The foregoing example was repeated with another type of aluminum alloy powder similar to the above Reynolds 5A but which contained more titanium, about 1,200 parts per million. Similar results were obtained.

EXAMPLE III

Example I was repeated with dodecanol to produce aluminum dodecoxide. Aluminum powder (Reynolds 5A), 10 grams; undecane, 100 grams; and $HOCH_2CH_2OCH_3$, 2 grams, were charged to the flask and the flask was heated to 190°C. Dodecanol, 40 grams, was then added slowly to the charge in the flask, the temperature being held at 190°C. Rapid reaction occurred. The undecane was then distilled off leaving a waxy solid. This was analyzed and found to contain about 94 percent aluminum tridodecoxide.

EXAMPLE IV

In a comparative example, Example I was repeated without the catalyst. There was no visible reaction. Then 25 milliliters of THF were added. Again there was no visible indication of reaction. Similar results were obtained when this experiment was repeated with xylene diluent instead of toluene and without catalyst. The significance of this change is that xylene reflux provided a higher temperature at atmospheric pressure but still there was no visible reaction without the catalyst.

EXAMPLE V

Example I is repeated with isobutanol. Similar desirable results are obtained.

EXAMPLE VII

Example I is repeated with $HO(CH_2CH_2O)_2CH_3$ catalyst. Similar desirable results are obtained.

EXAMPLE VIII

The foregoing examples are repeated with other alcohols, diluents, catalysts and aluminum type and compositions recited as useful herein which are herewith exemplified in the various combinations. Similar desirable results are obtained.

The foregoing disclosure of the invention is illustrative and descriptive thereof and various changes may be made within the scope of the claims without departing from the scope of the invention.

We claim:

1. In a process for producing aluminum alkoxides by reaction of aluminum and an alcohol of the formula:

$$R_2-\overset{R_1}{\underset{R_3}{C}}-OH$$

wherein $R_1$, $R_2$ and $R_3$ are H or alkyl radical each said alkyl radical having from one to about 20 carbon atoms, the improvement wherein the reaction is catalyzed by: alkoxy alcohol of the formula:

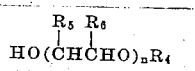

wherein $R_4$ is lower alkyl, aryl, alicyclic, aralkyl, alkaryl, or alkenyl radical having from one to about six carbon atoms, $R_5$ and $R_6$ are H, or lower alkyl radical having from one to about six carbon atoms, at least one of $R_5$ and $R_6$ being H, $R_6$ optionally being a part of a ring with $R_4$, $n$ is from 1 to about 5, the amount of the catalyst being from about 1.0 to about 30 percent by weight based on the aluminum reacted.

2. In a process in accordance with claim 1, the further improvement wherein the reaction is conducted in the presence of an aromatic alicyclic or aliphatic hydrocarbon diluent or in the presence of an excess of alcohol.

3. In a process in accordance with claim 1, the further limitation that the process is conducted at a temperature of from about 25°C. to about 180°C.

4. In a process in accordance with claim 1, the further limitation that the amount of diluent or excess alcohol is from about 0.5 to about 10 parts by volume per part of alcohol reacted.

5. A process in accordance with claim 1 conducted at a temperature of from about 80°C. to about 150°C.

6. A process in accordance with claim 1 conducted at a temperature of from about 100°C. to about 130°C.

7. A process in accordance with claim 1 conducted at a temperature of about 110°C.

8. A process in accordance with claim 2 conducted at reflux of the diluent or alcohol at about atmospheric pressure.

9. A process in accordance with claim 1 wherein the amount of the catalyst is from about 5 to about 20 percent by weight based on the aluminum reacted.

10. A process in accordance with claim 1 wherein the amount of the catalyst is about 10 percent by weight based on the aluminum reacted.

11. A process in accordance with claim 1 wherein the alcohol has straight chain unbranched carbon skeletal structure.

12. A process in accordance with claim 1 wherein the alcohol is ethanol.

13. A process in accordance with claim 1 wherein the alcohol is isopropanol.

14. A process in accordance with claim 1 wherein the catalyst is of the formula:

wherein $R_1$ is lower alkyl, aryl, alicyclic, aralkyl, alkaryl or alkenyl radical having from one to about six carbon atoms, $n$ is from 1 to about 5.

15. A process in accordance with claim 1 wherein the catalyst is $HO(CH_2CH_2O)CH_3$, or $HO(CH_2CH_2O)_2CH_3$ or tetrahydrofurfuryl alcohol.

16. The process of claim 2 wherein the diluent is toluene and the catalyst is $HOCH_2CH_2OCH_3$ and the temperature of the reaction is controlled at reflux of the toluene at about atmospheric pressure.

17. The process of claim 2 wherein the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is ethanol and the alcohol is supplied in an amount of from about 0 to about 5 percent excess above stoichiometric relative to the aluminum fed.

18. The process of claim 2 wherein the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is isopropanol and the alcohol is supplied in an amount of from about 0 to about 5 percent excess above stoichiometric relative to the aluminum fed.

19. The process of claim 1 wherein the diluent is toluene in an amount from about 3 to about 5 parts by volume per part of alcohol fed, the catalyst is $HOCH_2CH_2OCH_3$ in an amount of from about 10 to about 15 percent by weight based on the aluminum fed, the reaction temperature is controlled at reflux of the toluene at about atmospheric pressure, the alcohol is dodecyl alcohol and the alcohol is supplied in an amount of from about 0 to about 5 percent excess above stoichiometric relative to the aluminum fed.

* * * * *